SYSTEM FOR SYNCHRONIZING DIGITAL COMMUNICATION APPARATUS

Filed Dec. 18, 1963

INVENTOR
S. C. KITSOPOULOS
BY Ray M. Porter Jr.
ATTORNEY

Feb. 4, 1969 S. C. KITSOPOULOS 3,426,153

SYSTEM FOR SYNCHRONIZING DIGITAL COMMUNICATION APPARATUS

Filed Dec. 18, 1963 Sheet 2 of 2

United States Patent Office 3,426,153

Patented Feb. 4, 1969

3,426,153
SYSTEM FOR SYNCHRONIZING DIGITAL COMMUNICATION APPARATUS

Sotirios C. Kitsopoulos, Summit, N.J., assignor to Bell Telephone Laboratories, Incorporated, New York, N.Y., a corporation of New York Filed Dec. 18, 1963, Ser. No. 331,422
U.S. Cl. 179—15 6 Claims
Int. Cl. H04j 3/06; H04b 1/00, 7/00

ABSTRACT OF THE DISCLOSURE

Apparatus for developing word synchronization between the transmitting and receiving terminals of a digital communications link through the insertion of a prefix pattern code into the message train at the transmitting terminal. To avoid incorrect framing the message signal is examined to ascertain whether any succession of message digits is identical to the chosen prefix pattern code. When such an event occurs the least significant digit of the message signal is inverted to avoid incorrect framing while at the same time imparting no more than a single quantization level of error to the intentionally altered message word.

Figure 1:
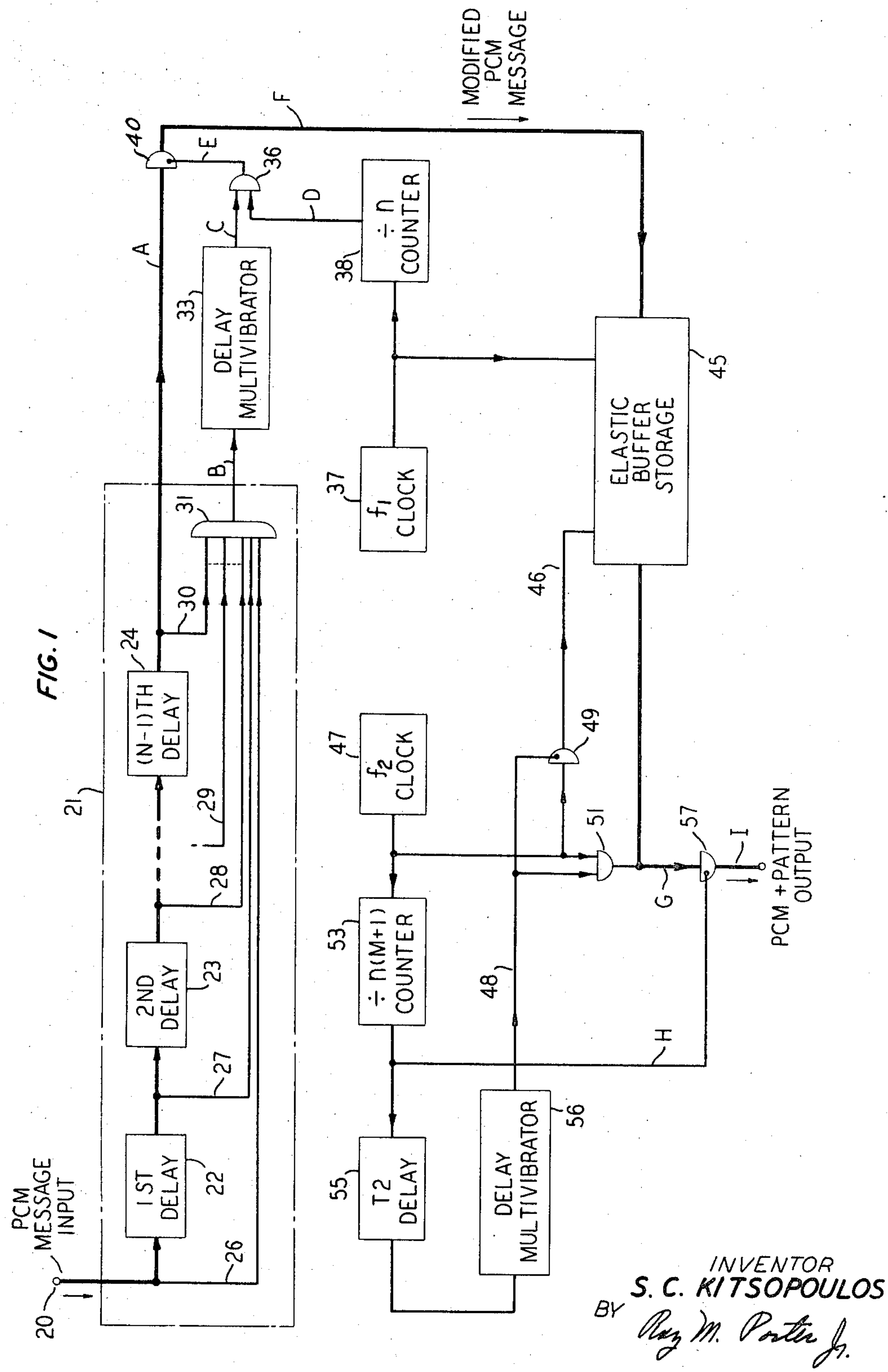

This invention relates to digital communication systems and, more particularly, to a method of and apparatus for developing word or group synchronization between the transmitting and receiving terminals of a digital link.

There are two distinct types of synchronization which must be established between the transmitting and receiving ends of a digital communications channel. The first of these, usually termed "clocking," identifies those points in time at which each pulse, if transmitted, should be received. Normally, clocking is accomplished by deriving the "clock" signal from the incoming waveform. Clock signal extraction may be conveniently instrumented by applying the incoming pulse train to a high-Q, LC tank circuit tuned to resonate at the pulse repetition rate. A typical clock timing system using this approach is described in detail by J. S. Mayo on pages 59 through 66, volume XLI, Number 1, Bell System Technical Journal, January 1962. The identification of time-slots achieved by clocking allows the receiving apparatus to reproduce the original pulse train as transmitted—even though the message signal may have been distorted during transmission by noise, crosstalk and the transfer characteristics of the channel.

In order to decode the reproduced series of ON and OFF pulses, however, another form of synchronization is required. This results from the fact that the digital signals are arranged into block codes or words, usually comprising a fixed number of differently weighted digits. Word synchronization or "framing" is therefore required in order to interpret the significance of each received digit. Consequently, the location of at least one marking digit in the incoming pulse train must be established. Once this has been done, the significance of other digits may be deduced by counting from the marking digit.

Accordingly, it is a principal object of the present invention to establish a time marker at the receiving terminal of a digital communication system such that word synchronization may be achieved.

In one general class of word synchronization systems, some statistical property of the incoming signal is monitored and compared with the value to be expected when the signal is synchronized properly. In the event of a substantial discrepancy between the two values, the receiving apparatus starts to slip time-slots, one by one, until the expected property reappears. As an example, in PCM systems wherein an analog speech signal is encoded into Gray code words, the second digit of each word is more likely to be a "1" than a "0". If these second digits suddenly become random (about half being "0's"), the receiver is informed that the system is out of synchronization. Accordingly, it begins slipping time-slots until the high statistical occurrence of "1's" in the second time-slot reappears. This form of statistical framing is described in U.S. application Ser. No. 272,588, filed Apr. 12, 1963, by J. W. Pan. Other synchronizing systems which are responsive to some statistical property of the incoming waveform are disclosed in U.S. Patent 3,175,157, issued to J. S. Mayo and R. J. Trantham Mar. 23, 1965; in Patent 3,159,811, issued to D. B. James and W. T. Wintringham Dec. 1, 1964; and in Patent 3,241,067, issued to D. B. James and F. W. Mounts Mar. 15, 1966. While each of these word synchronization systems possesses significant advantages, they are rather slow acting. In order to initially establish synchronization or to re-establish synchronization once the system has gone "out of frame," sufficient data must be processed to obtain the necessary statistical information before synchronization may be accomplished.

In another known scheme, synchronization is achieved more rapidly by transmitting a recognizable pattern of pulses in front of the message pulses. Upon detecting this prefix pattern, the receiving apparatus establishes the required time marker. Since the random occurrence of the prefix pattern within the message train would cause the receiver to synchronize improperly, the pattern is excluded from the message train in the sense that no message quantile is assigned to this pattern. For example, if the five-digit code word "11111" is chosen for the prefix pattern and conventional binary coding is used, a limiter might be placed on the input of the coder to prevent the generation of the chosen prefix word.

Unfortunately, there is also a possibility that adjacent message words may also create a misleading pattern. Thus, the successive transmission of the two words "XX111" and "11XXX" (where "X" indicates a digit which may be either a "1" or a "0") would form the pattern by taking the last three digits of the first word together with the first two of the second. In order to minimize this possibility, it has been suggested that only selected message codes be used wherein the probability of adjacent words forming the pattern is small. This scheme, which is disclosed by E. N. Gilbert in the article "Synchronization of Binary Messages" which appeared in the I.R.E. Transactions on Information Theory, pp. 470–476, Sept. 1960, suffers the disadvantage of reduced coding efficiency. Since a relatively large number of otherwise useful code words are prohibited, a greater number of digits must be transmitted to send the same information.

It is therefore a further object of the present invention to accomplish rapid initial synchronization and resynchronization while maintaining a high degree of coding efficiency.

In a principal aspect, the present invention takes the form of a method of and apparatus for developing word synchronization between the transmitting and receiving terminals of a digital communications link. As in prior systems, a prefix pattern code is inserted into the message train at the transmitting terminal. Upon positive recognition of this pattern at the receiver, a time marker is established such that the significance of subsequent message digits may be interpreted. In accordance with a principal feature of the invention, means are included at the transmitting terminal for deteictng any succession of message digits which happens to be identical to the chosen prefix pattern code. Because such a succession of message digits might cause incorrect framing, means are provided for inverting one of the digits in the randomly generated pattern sequence. According to a further feature of the invention, the digit selected for inversion in the least significant digit of a message word, wherever that digit might occur within the misleading pattern. This selection insures that the inversion of the digit imparts no more than a single quantization level of error to the intentionally altered message word.

These and other objects, features and advantages of the invention will become more apparent through a consideration of the following detailed description and the accompanying drawings. In the drawings, FIG. 1 illustrates apparatus embodying the present invention; and FIG. 2, lines A through I show several typical waveforms as they might appear on various conductors within the circuit shown in FIG. 1.

The apparatus shown in FIG. 1 is adapted for periodically inserting a unique pattern of synchronizing digits into a train of message digits where the digits appear, most significant digit first. In the specific embodiment of the invention shown in FIG. 1, the synchronizing pattern to be inserted comprises a series of $n$ "1's" or "ON pulses" in succession. In FIG. 1, heavy line segments have been employed to designate those conductors over which the message digits are carried. Typical waveforms which might exist on those conductors designated by letters in FIG. 1 are shown by the lines bearing like letters in FIG. 2.

The message digits are first applied to the input terminal 20 and pass to a "pattern detector" 21. The message digits then appear on conductor A, delayed but unaltered. Whenever any succession of digits within the train of message digits happens to be identical to the synchronizing pattern (that is, whenever $n$ ON pulses appear in a row), the conductor B is energized. The signal on conductor B then actuates circuitry for inverting a least significant digit within the message train, thus preventing the random transmission of the synchronizing pattern. The intentionally altered message train appears on conductor F and passes to circuitry which inserts the synchronizing pattern to the altered train at timed intervals. The final output train appears on conductor I.

Figure 2:
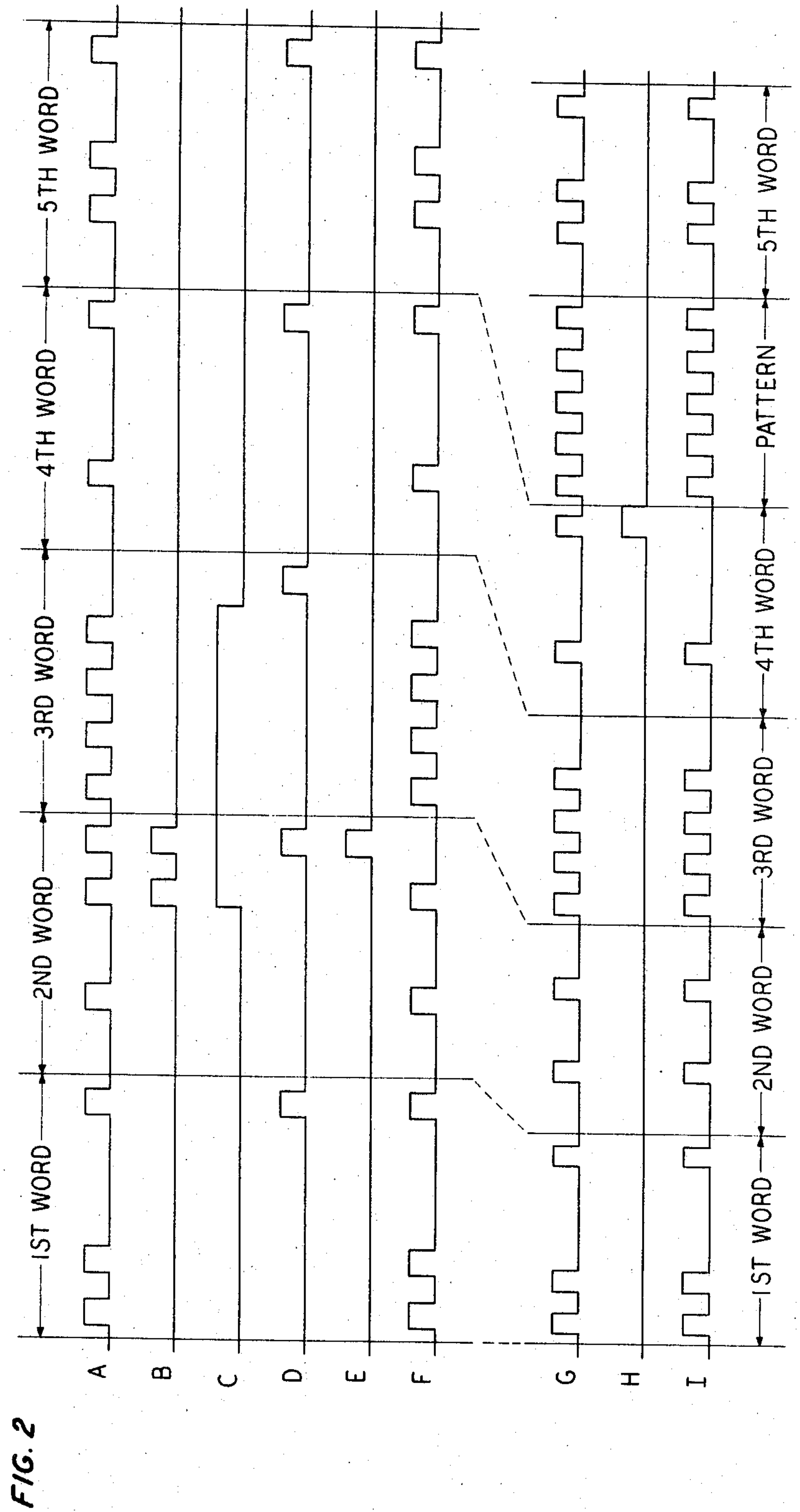

The pattern detector 21 comprises $(n-1)$ delay units 22, 23 and 24 (one less than the number of digits in the pattern to be detected), all of which are connected in series between the message input terminal 20 and the detector output conductor A. Each delay unit exhibits a single time-slot of delay. The delay line thus formed has $n$ output taps 26 through 30 which are connected to the $n$ inputs of an AND gate 31. It will be apparent that AND gate 31 energizes the conductor B whenever the digit applied to input terminal 20 as well as each of the $(n-1)$ previous digits are all "1's." FIG. 2, lines A and B, further illustrate the operation of pattern detector 21. FIG. 2A shows a typical message train of five binary words, each made up of 5 digits, as they appear on conductor A. FIG. 2B shows the consequent waveform appearing on conductor B, the output of AND gate 31. Note that a pulse appears on conductor B whenever the first of five successive pulses appears on conductor A.

Conductor B is connected to the input of a delay multivibrator 33 which delivers its output signal via conductor C to one input of an AND gate 36. The delay multivibrator 33, as illustrated by a comparison of FIG. 2, lines B and C, delivers an output to conductor C as soon as conductor B is energized and continues to deliver this output for four pulse periods after the last pulse to appear on conductor B. Pulses are applied to the other input of AND gate 36 via conductor D at the same time the least significant digits (the last digit in each word) appear on conductor A. These pulses originate in the clock source 37 which generates a steady train of pulses at a pulse repetition rate equal to that of the message pulses, $f_1$. The counter 38 delivers an output pulse upon the appearance of every $n$th clocking pulse, in the least significant digit position. Whenever both conductors C and D are energized, an output signal is delivered to the INHIBIT gate 40 by way of conductor E. This action is illustrated by FIG. 2, lines C, D and E of the drawings. Note that the INHIBIT gate 40 is actuated to stop the flow of message digits to conductor F only at the moment the last digit of the second word appears on conductor A as shown by FIG. 2E. Thus, the least significant digit of the second word is changed to a "0" or OFF pulse thereby eliminating the randomly generated pattern sequence. The resulting altered message train as it appears on conductor F is shown in FIG. 2F.

After the message train has been modified in the matter outlined above, the synchronizing pattern may be periodically inserted into the information-carrying train. In the embodiment of the invention shown in FIG. 1 of the drawings, $n$ ON pulses are "stuffed" into the message train after every M code words. Accordingly, to avoid the loss of information, the output pulse repetition rate, $f_2$, must be greater than the input repetition rate, $f_1$. More exactly:

$$f_1=\frac{M}{(M+1)}f_2$$

The modified train from conductor F is read into an elastic buffer storage unit 45. A variety of usable elastic storage devices are known to the art. An elastic storage device which may be used as shown in FIG. 1 of the drawings is disclosed in U.S. application Ser. No. 280,891, filed May 16, 1963 by P. Mallery. Digits are read into the elastic store at a constant rate, $f_1$, and a digit is read out whenever a read-out pulse is applied to the conductor 46. Read-out pulses are normally applied to conductor 46 from clock source 47 at the repetition rate $f_2$. Whenever conductor 48 is energized, however, no digits are read out of the elastic storage unit 45 since INHIBIT gate 49 blocks the flow of clock pulses to conductor 46. When conductor 48 is energized, these clock pulses flow instead from clock source 47 to conductor G through AND gate 51, thus adding the pattern to the message train.

A counter 53 is employed to develop the appropriate timing signal for stopping the flow of digits from the elastic store 45 and inserting instead the succession of clocking pulses which form the synchronizing pattern. The counter 53 energizes conductor H for one time-slot upon receiving a group of $n(M+1)$ clock pulses from source 47. The relative position of the pulse on conductor H is shown in FIG. 2H. This pulse is delayed one time-slot more b ythe delay unit 55 and applied to the input of the delay multivibrator 56 which energizes conductor 48 for five time-slots between the 4th and 5th words of the original message. The fifth message word is delayed in the elastic storage device 45 until the five synchronizing pulses have been applied to conductor G as shown by FIG. 2G. The initial pulse from counter 53 which appears on conductor H is also applied to the INHIBIT gate 57. The action of INHIBIT gate 57 prevents the digit immediately preceding the synchronizing pattern from being a "1" or ON pulse. FIG. 2, lines G, H, and I illustrate this operation. The final output signal appears on conductor I in a form ready for transmission.

In the embodiment of the invention illustrated by FIGS. 1 and 2, a series of "1's" or ON pulses was chosen for the synchronizing pattern. Assuming that all digits have equal probability of being "1" or "0", the probability, $p$, that the least significant digit will be inverted in a given message word by the gate 40 is given by the following relation:

$$p=\frac{n+1}{2^{n+1}} \qquad (1)$$

where $n$ is the number of digits in the pattern. The last digit before the inserted prefix must also be inverted by gate 57 (if it is a "1") to avoid a premature pattern. The probability of this occurrence is $1/2M$ where the pattern is inserted periodically after M message words. As will be appreciated, the higher the probability that message words must be altered, the higher "error noise" contributed by the digit inversion operation. If the number of digits in the pattern is sufficiently large, however, the error noise contributed by the operation of INHIBIT gate 40 may be quite small in comparison to the usual quantizing noise of the system. It may be shown that the relationship between the R.M.S. error noise "E" contributed by gate 40 and the R.M.S. quantizing noise "N" of an $n$ digit pulse code modulation system is given by the following equation:

$$20 \log_{10} \frac{E}{N} = 10 \log_{10} 12p(1-p) \quad (2)$$

where $p$ is the probability given in relation (1) above. Thus, for a PCM system using nine digits per code word, the error noise contributed by gate 40 is more than nine decibels below the level of quantizing noise.

In the illustrative embodiment of the invention discussed in conjunction with FIGS. 1 and 2, the number of pattern digits was equal to the number of digits in the message code words. It will be apparent to those skilled in the art that such an equality is not necessary to the operation of the system. Furthermore, the pattern need not consist of a series of like digits as employed in the illustrative embodiment. For example, the use of a pattern wherein the first (or last) digit is different from the others eliminates entirely the possibility that the digit preceding the pattern will cause premature synchronization. Accordingly, the gate 57 might be omitted and an inverter connected in series with conductor 26 or 30 if such a pattern were used. Unfortunately, however, the probability of the least significant digit being inverted by gate 40 when such a pattern is employed rises to the value $(n/2^n)$. In consequence, the particular pattern used may be selected in accordance with the number of pattern digits used, the frequency of pattern insertion, etc.

It is to be understood that the specific embodiment of the invention described in detail above is merely illustrative and that numerous other embodiments could be devised by those skilled in the art without departing from the spirit and scope of the invention.

What is claimed is:

1. Apparatus for inserting a unique pattern of timing digits into a train of message digits which comprises, in combination, means for detecting any sequence of digits in said train of message digits which is identical to said unique pattern, means for changing the message state of at least one digit in each sequence detected to form an altered train, and means for adding said unique pattern of digits to said altered train.

2. Apparatus as set forth in claim 1 wherein said means for changing the message state of one digit includes means for identifying the least significant digit in each sequence detected and means responsive to said last-named means for changing the message state of the digit identified.

3. In combination, a source of a train of digital message words each of which comprises $n$ digits arranged in accordance with a binary permutation code, means for detecting any sequence of digits in said train which is identical to a predetermined synchronizing pattern of digits, means for changing the message state of a selected digit in said sequence to form a modified train, said selected digit being the least significant digit of one of said digital message words, and means for adding said synchronizing pattern of digits to said modified train at timed-intervals.

4. Apparatus as set forth in claim 3 wherein said means for adding comprises, in combination, an elastic storage device having input means adapted to receive said modified train at a first digit repetition rate and having output means adapted to read out said modified train in bursts at a second digit repetition rate, means for generating said synchronizing pattern, and means for adding said synchronizing pattern at said second rate to said modified train between said bursts.

5. In combination, a source of digital message word signals, means for inserting predetermined digital words representing framing information in said train of digital message words, means for detecting any portion of said digital message signal which is substantially identical to an inserted digital word, and means responsive to said detection means for modifying each of said portions to form an altered waveform with at least one digit different from the corresponding digit in said inserted word.

6. The method of inserting predetermined digital words representing framing information into a digital signal comprising message words which comprises, detecting any portion of said digital message signal which is substantially identical to an inserted digital word, modifying each of said portions so detected to form an altered waveform with at least one digit different from the corresponding digit in said inserted word, and adding said predetermined digital words to said altered waveform.

References Cited

UNITED STATES PATENTS

| | | | |
|---|---|---|---|
| 3,261,921 | 7/1966 | Hakim et al. | 179—15 |
| 3,226,482 | 12/1965 | Wright | 179—15 |
| 3,201,777 | 8/1965 | Brown | 179—15 |
| 3,083,267 | 3/1963 | Weller | 179—15 |

RALPH D. BLAKESLEE, *Primary Examiner.*

U.S. Cl. X.R.

325—38, 41; 328—63